INVENTORS: L. B. LUCKNER
E. D. REED
BY
ATTORNEY

Aug. 6, 1957  L. B. LUCKNER ET AL  2,802,137
ELECTRON DISCHARGE DEVICE OF THE CAVITY RESONATOR TYPE
Filed June 21, 1954  3 Sheets-Sheet 2

INVENTORS: L. B. LUCKNER
E. D. REED
BY
*James J. Falk*
ATTORNEY

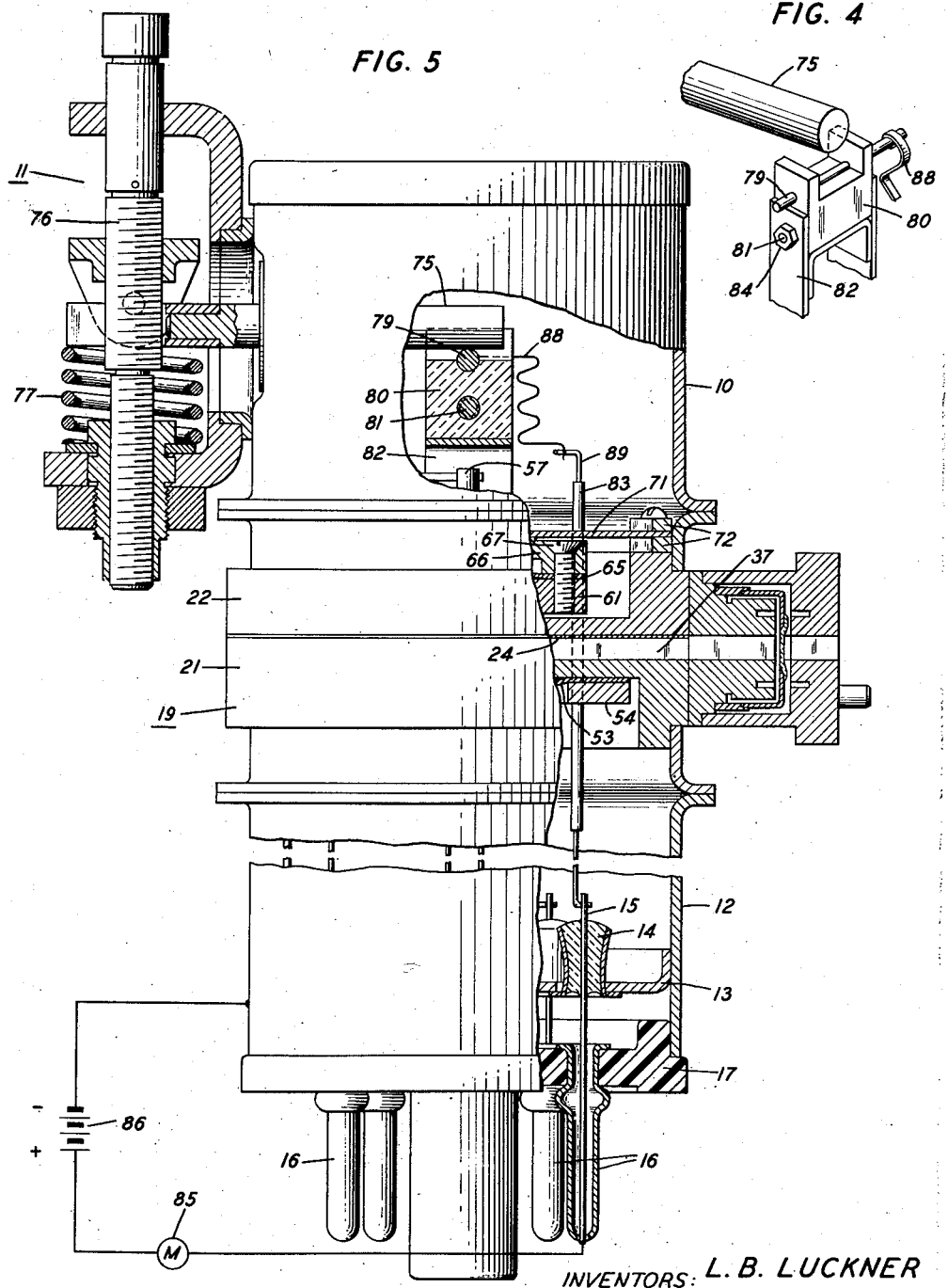

United States Patent Office 2,802,137
Patented Aug. 6, 1957

2,802,137

ELECTRON DISCHARGE DEVICE OF THE CAVITY RESONATOR TYPE

Leo B. Luckner, Chatham, and Eugene D. Reed, Morristown, N. J., assignors to Bell Telephone Laboratories, Incorporated, New York, N. Y., a corporation of New York Application June 21, 1954, Serial No. 437,960

16 Claims. (Cl. 315—5)

This invention relates to electron discharge devices and more particularly to reflex klystrons of the cavity resonator type and to the fabrication of such klystrons.

The frequency of a reflex oscillator of the cavity resonator type is determined by the dimensions of the cavity; in fact, the linear dimensions of the frequency determining resonant cavity are inversely proportional to the frequency of oscillation. Prior oscillators operable in the centimeter range, say at 4000 megacycles, have employed resonant cavities having outer diameters as small as one inch. It is therefore apparent that an oscillator in the millimeter range, operable at frequencies of the order of 60,000 megacycles, must have a resonant cavity whose dimensions are one-fifteenth that of the 4000 megacycle cavity, or of the order of 67 mils. With this markedly reduced dimension arise the concomitant problems of increased dimensional tolerances, as for the same relative accuracy in the resonant frequency, the allowable tolerance is reduced by the same factor as the dimensions. Thus an acceptable dimensional tolerance of ±2 mils for the 4000 megacycle cavity is equivalent to an acceptable tolerance of ±0.13 mil for the 60,000 megacycle cavity.

The attainment of practical reflex oscillators operable at such high frequencies by priorly known techniques and structures has not been feasible for a number of reasons, including the dimensional one discussed above. Additionally, the Q of the resonant cavity, which is a measure of the inherent loss in the electrical circuit defined by the cavity, is inversely proportional to the square root of the frequency. Thus the 60,000 megacycle cavity would have an internal Q lower by a factor of $\sqrt{15}$, or roughly 4, provided its surface smoothness is relatively as good as that of the 4000 megacycle cavity. Accordingly, in order to retain the desired value of Q, the surfaces of the cavity must be smoother and freer from irregularities for a higher frequency klystron.

With such minute dimensions the problem of tuning the resonant cavity cannot be resolved by priorly known practices. Any change in the tuning structure or linkage would produce a very large effect on the resonant cavity and thermally induced variations in tuner position in prior tuner assemblies, during the processing of the device, could readily fracture and destroy the very small flexible diaphragm defining the movable wall of the resonant cavity.

With such very small dimensions the variation of diaphragm position to tune over an appreciable range, as of the order of 48,000 to 60,000 megacycles, is similarly very small. For a variety of reasons, it is possible to lose the output, so that the kylstron appears to have become inoperative, merely because the resonant cavity is tuned outside its frequency range; further one may be unable to return to that range without damaging the cavity.

It is a general object of this invention to provide an improved reflex klystron oscillator operable in the millimeter range.

It is an object of this invention to enable the attainment of accurately determined minute dimensions, within acceptable dimensional tolerances, exceedingly smooth surfaces free of any irregularities, and capable of considerable power dissipation, all in the very small dimensioned elements requisite to a high frequency reflex klystron oscillator.

It is another object of this invention to prevent the destruction of the resonant cavity by thermally induced variations in the tuner mechanism during the processing of the device.

It is a further object of this invention to enable the precise determination by the tuner mechanism of the physical dimensions of the resonant cavity for the frequency range of the device even if the output is lost, without danger of rupturing or impairing the members defining the resonant cavity.

It is a still further object of this invention to enable the salvaging of the fairly expensive electrical circuit defining portions of the klystron on failure of the cathode or other mechanical failure causing the klystron to be inoperative.

These and other objects of this invention are attained in a specific illustrative embodiment wherein the essential elements of the electrical circuit of the resonant cavity are all defined in a single block of conducting material. The block, which is advantageously circular to mate with cylindrical metallic envelope portions, has a central aperture and a planar surface in which may be hubbed a first annular groove encompassing the aperture and defining the resonant cavity of the device, a second annular groove, and a shallow choke section between the two annular grooves and communicating with each of them. A tuning diaphragm extends over the two annular grooves. An output wave guide channel extends in the planar surface of the block from the outer grove to one edge of the block and has an initial shallow transformer section for matching the impedance of the outer cavity or groove to the wave guide channel. The channel side walls are straight and parallel and the walls themselves extend directly to the outer cavity, there being no iris or window between the outer cavity and the wave guide.

The back surface of the block is also formed to provide an annular channel around the central aperture in which an electron gun is fitted. The central aperture is flared adjacent the back surface to define the focusing electrode of the gun and also has hubbed in it adjacent the planar surface of the block an annular recess in which a grid is located. This grid has a plurality of thin ribbons extending, edgewise to the path of the electron beam, across a circular outer piece, the ribbons being slightly curved; such a grid structure is disclosed in R. L. Vance Patent 2,296,885, September 29, 1942.

The tuning mechanism comprises a flat spring which is positioned to provide an initial determination of the dimensions of the resonant cavity and a tuner assemblage positioned in the envelope of the device. The tuner assemblage includes a tuner arm extending into the envelope and, in normal position, resting on a contact pin in an insulator. This insulator is mounted by the mechanical linkage serving to transmit motion from the tuner arm to the diaphragm, the linkage also supporting the repeller electrode so that the repeller electrode position as well as the diaphragm position is varied.

In accordance with one aspect of this invention, the tuner arm is not connected to the contact pin but merely rests thereon. During the processing of the device, as during the outgassing and baking of the envelope and the internal elements, the evacuating and the sealing of the envelope, the tuning arm is positioned away from the contact pin so as to be removed therefrom by a short distance, as of the order of a few mils. Thus the transmission of uncontrollable motion thermally induced in the tuning assembly during the processing to the tuning linkage and to the diaphragm is prevented, thereby assuring that the diaphragm and the grids of the cavity resonator will not be damaged during the processing of the device. After the klystron has been sealed off, the tuner assembly differential screw is turned to bring the tuning arm into contact with the contact pin of the tuning linkage.

In accordance with another aspect of this invention, a lead is brought through the cavity of the klystron and insulated therefrom, as by being within a ceramic tube, from a terminal pin in the base of the envelope to the contact pin. A meter, or other indicating device, and a battery are connected between this terminal pin and the envelope of the device, to which the tuning arm is electrically connected. The initial contact of the tuning arm and the contact pin is thus determined. At this position of the tuning screw the frequency of the resonant cavity is determined by the internal flat spring and is probably not known. However, this point, which is thus readily determined in accordance with our invention, serves as a zero point or bench mark for turning of the external tuner screw to bring the frequency of the resonant cavity into the desired operating range, as the number of turns of the screw required to go from this point to a given frequency in the operating range is known.

If, during the operation of the klystron, the klystron has been tuned outside its tuning range, which may happen, and it is desired accurately to bring the klystron back within its operating range in a safe manner, without possibility of damage to the diaphragm or the grids, the tuner screw need only be turned until the tuning arm is free of the contact pin and then this bench mark or zero set again found by bringing the tuner arm into contact with the contact pin. It should be realized that in many cases when a klystron goes dead and has no response over the desired range of oscillation because it has been tuned to a frequency outside the range, it is not known whether the klystron has been tuned to a frequency above or below the operating range. However, as the glystron tuning assembly is always returned to a zero setting in accordance with this invention, this is not important and there is no chance of damage to the diaphragm or grids. Further by thus providing a zero setting or bench mark in the structure of the klystron itself, it is unnecessary to have expensive wave meters available for each klystron or to use such meters in attempting to reestablish the position of the tuner within the operation range of the klystron.

The envelope of the klystron comprises an upper metallic bulb and a lower metallic bulb which are both sealed to a central metallic portion. This central metallic portion comprises the cavity block and a mating housing member. The repeller electrode is supported by the housing member and the electron gun assembly by the cavity block. The klystron can therefore be readily disassembled by removing the two bulb portions from the central block, there being no mechanical connections between the upper and lower bulb portions and the central block other than the electrical leads connecting the various elements of the klystron to terminal pins in the base of the lower bulb portion. However, none of the elements are supported by either bulb portion. If, on disassembling a klystron, in accordance with this invention, that is inoperative, it is found that the cathode is no longer active, the cathode may be replaced and the other elements of the klystron salvaged and employed in a new tube merely by sealing thereon new upper and lower bulb portions. As the cavity block is an expensive part, its salvageability is important.

It is a feature of this invention that a klystron for operation in the millimeter wave range comprise a single block of conducting material having a planar top surface in which are defined a pair of annular grooves encompassing a central aperture, a shallow choke section recess between the two cavities, and a wave guide channel having straight side walls extending directly into the outer of the cavities and having also a shallow transformer section for matching the impedance of the cavity to the wave guide. By providing all these elements in a single block internal losses due to brazes, connections, and discontinuities in the surfaces of the high frequency circuit elements are avoided, thereby enabling the Q of the passive circuit to be high. Additionally, each of these grooves, apertures, or channels may be formed by a single hubbing operation to provide exceedingly smooth surfaces, far smoother than attainable by drawn, plated, or machined parts which would introduce loss into the circuit so as to be unacceptable at the very high frequency range of oscillation desired.

It is another feature of this invention that the initial grid of the resonant cavity comprise a plurality of ribbon like members supported by a ring, the ring being positioned on an internal ledge in the portion of the block defining the central aperture directly adjacent the planar surface of the block.

It is still another feature of this invention that the resonant cavity be tuned by mechanically varying the position of a diaphragm defining one wall or boundary of the cavity in response to the motion of an externally mounted tuner assemblage, the assemblage including a tuner arm extending into the envelope of the device and resting on a contact pin of the mechanical tuning linkage connected to the diaphragm, but not connected to the contact pin.

It is a further feature of this invention that the contact pin be mounted on an insulator so as to be insulated from the tuning linkage and the remainder of the elements of the device, a lead connection being provided from one of the terminal pins in the base of the envelope to the contact pin. In accordance with this feature of the invention an alarm or indicating circuit including a meter or other indicating device and a source of voltage is connected between the terminal pin connected to the contact pin and the envelope of the device, to which the tuning arm is electrically connected, to detect the initial contact of the tuning arm and the contact pin.

It is a still further feature of this invention that the tuning arm be removed from the contact pin, as by a few mils distance, during the processing of the device to prevent transmission of thermally induced motion from the tuning assemblage to the diaphragm and consequent damage or rupture of the diaphragm and cavity grids but be brought in contact with the contact pin after processing of the device to enable tuning of the resonant cavity to the desired frequency range of operation.

It is still another feature of this invention that the klystron have a metallic envelope including an upper and a lower bulb portion and a centrally metallic portion sealed thereto, the central metallic portion including the cavity block. In accordance with this feature of the invention there are no elements of the electrical circuit supported or mounted by the two bulb portions so that the tube may be readily disassembled, and the central portion removed and salvaged for employment in another tube, merely by removing the two end portions. As the tuning arm merely rests on the contact pin, in accordance with aspects of this invention, there is no permanent linkage or connection between the upper bulb portion and the central metallic portion through the tuning mechanism. Further by having the central metallic portion define a part of the envelope of the device the transfer of heat from the cavity defining portions of the cavity block to outside the tube is facilitated, there being but one integral member defining the resonant cavity and extending through the envelope of the device.

A complete understanding of this invention and of these and other features thereof may be gained from consideration of the following detailed description and the accompanying drawing, in which:

Fig. 4 is an enlarged perspective view of the tuner arm and contact pin assembly of the embodiment of Fig. 1; and Fig. 5 is a schematic sketch showing one particular embodiment of an alarm or indicating circuit that may be employed in the combination of this invention.

Figure 1:
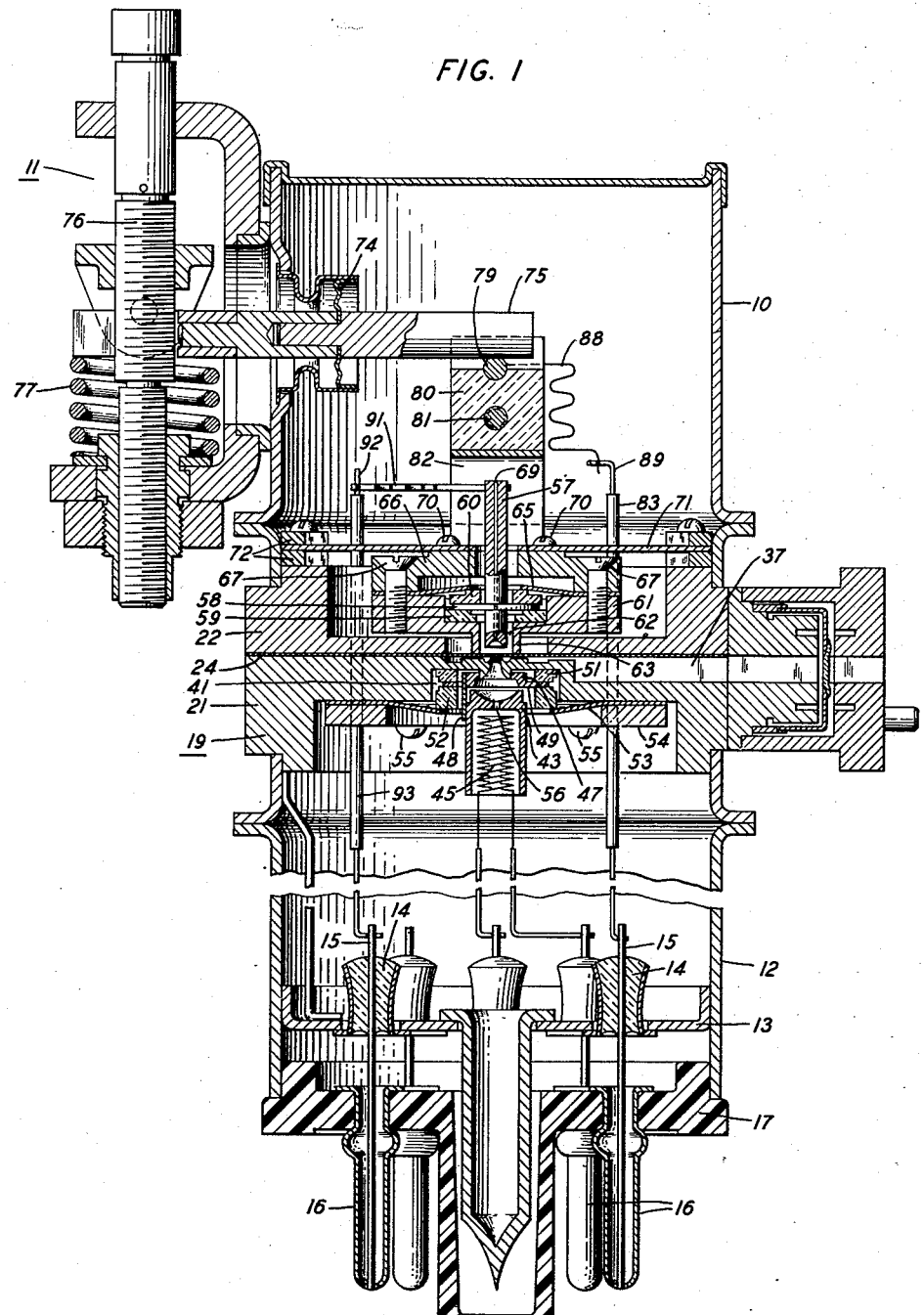
Fig. 1 is a sectional view of a electron discharge device in accordance with one specific illustrative embodiment of this invention.

The specific illustrative embodiment of this invention depicted in Fig. 1 of the drawing comprises an upper bulb portion 10 having a tuner unit 11 sealed in one wall thereof, a lower bulb portion 12 having a base 13 including insulating eyelets 14 through which leads 15 extend to terminal pins 16 mounted in an insulator socket 17 attached to the bulb portion 12, and a central portion 19. The central portion 19 is built around a pair of blocks 21 and 22, the block 21 being the single cavity block in which are advantageously hubbed all the electrically significant dimensions of the structure. The block 21 is sealed to the lower bulb portion 12 and the block 22 to the upper bulb portion 10, the two blocks having a thin diaphragm member 24, best seen in Fig. 2, interposed between them and sealed to them.

Figure 2:
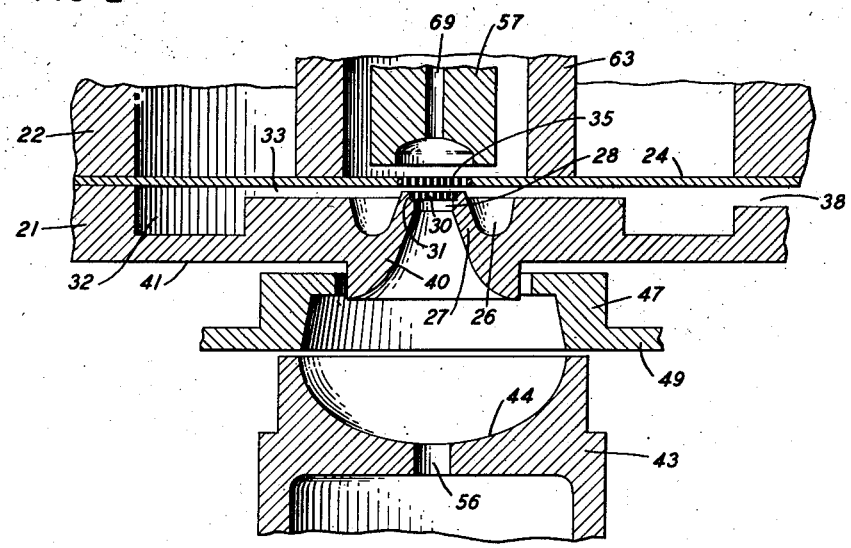
Fig. 2 is an enlarged view of the resonant cavity and repeller electrode of the device of Fig. 1, showing particularly the grids across the resonant cavity and the electrically significant dimensions of the device.
Figure 3:
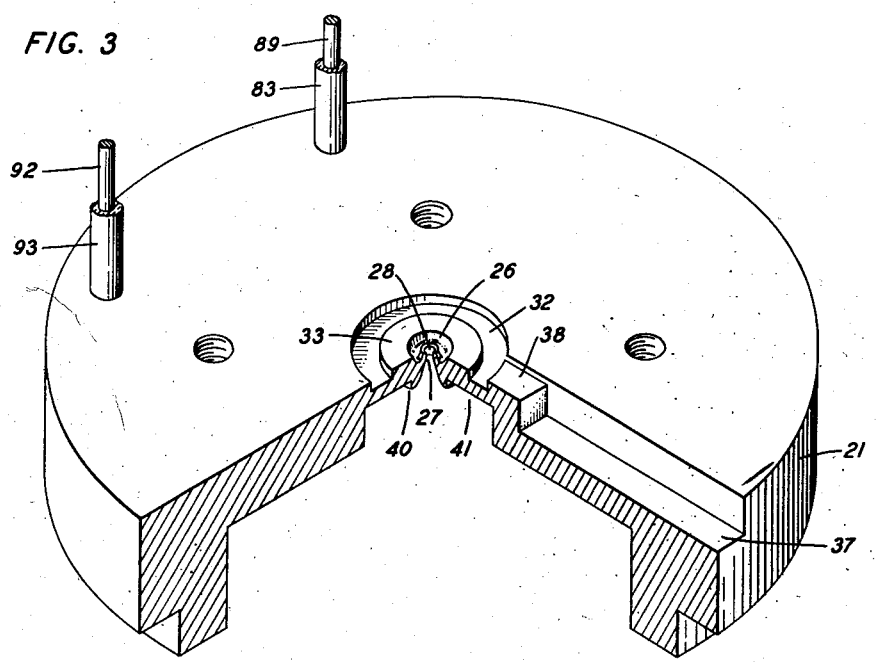
Fig. 3 is a perspective view, partially cut away, of the single block defining the various elements of the passive circuit in accordance with an aspect of this invention.

The lower or cavity block 21, as best seen in Figs. 2 and 3, has a first annular groove 26 in its upper surface encompassing the nose portion 27 having a central aperture 28 therethrough. As seen in Fig. 2, a grid 30 rests on a ledge 31 in the inner surface of the nose portion 27, the ledge 31 being advantageously formed by hubbing simultaneously with the grooves. A second annular groove 32 encompasses the first groove 26 and communicates therewith by a shallow recess 33. The diaphragm 24 extends across the grooves 26 and 32 and the recess 33 and has a grid 35 located therein in coaxial alignment with the grid 30.

A straight channel 37 is also located on the upper surface of the cavity block 21 and has a step or shallow portion 38 directly adjacent the second annular groove 32, the step defining an impedance transformer between the groove 32 and the wave guide channel 37.

The entire passive circuit of the klystron is thus located in this single cavity block 21 and comprises the primary, frequency determining cavity 26, the stepped choke section 33 which permits the use of a sufficiently large tuning diaphragm 24, the broadband output transformer 38, and the output wave guide 37. The block 21 is advantageously of copper and is fabricated by an initial hubbing operation whereby the various channels, recesses, and grooves may be formed and then by precision machining of the top planar surface and under surface. Besides these passive circuit elements defined by a hubbing operation on this single cavity block, the block 21 also provides the focusing anode 40 formed by flaring the central aperture 28 and providing a circular groove 41 in the back surface of the block 21; a peripheral recess or ledge 31 is provided, as by hubbing, in the cavity post or nose portion 27 which serves as the nest for the grid 30. This one piece construction of the cavity block in accordance with this invention affords a number of important electromechanical advantages over prior assemblages of distinct elements. In a cavity block structure in accordance with this invention there are no sharp internal contours in the inner frequency determining cavity 26 and hence the inner cavity has a favorable shape factor. Further the lossy braze joint between the diaphragm 24 and the cavity block 21 is located in the outer choke section adjacent groove 32 and thus in a region of low current density where it does not seriously degrade the internal Q of the resonant circuit. By a single block construction all the surfaces carrying high frequency currents may be produced solely by a hubbing operation after which they require no further machining or handling so that a mirror smooth surface and finish can be produced quite readily, thereby assuring a high Q in the circuit. Further by being able to employ a single hubbing process for the determination of all dimensions of the passive circuit in this single cavity block at one time excellent dimensional reproducibility is assured and there is no build up of tolerances due to individual piece parts being assembled together. As will be recalled, for devices operating in the very high frequency range the dimensional tolerance problem becomes acute and the actual dimensions themselves become very minute. This can be further appreciated from a consideration of the dimensions for one specific illustrative embodiment of our invention in accordance with Fig. 1 which dimensions are given further below.

Further by employing a single cavity block in which all the elements of the passive circuit are located and which defines a portion of the envelope of the device and thus extends outside the envelope, in accordance with this invention, the problem of carrying the power, which may be of the order of 25 watts, dissipated on the cavity post 27 is greatly reduced. The single cavity block 21 also advantageously has a flat upper surface, as clearly seen in Fig. 3, which facilitates inspection and measurement of the electrically significant dimensions during the fabrication of the device. It also enables the single flat diaphragm 24 to serve both as the flexible tuning diaphragm for the resonant cavity and the top wall of the output wave guide, the diaphragm 24 advantageously being of a diameter equal to that of the cavity block 21.

As can be seen clearly in Fig. 3, the output transformer does not require an iris between the wave guide and the groove 32; for the dimensions involved an iris would be exceedingly difficult to fabricate. The stepped output transformer 38 is approximately a quarter wave transformer of full wave guide width. Its height determines the tightness and its length the uniformity of the coupling between the wave guide channel 37 and the secondary groove 32.

In the hubbing operation a hardened and highly polished steel die, the inversion shape of the impression to be produced, is forced into a cylindrical copper blank by means of a hydraulic ram. The resulting impression not only conforms very colsely to the dimensions of the die, but also has the same surface smoothness and contour definition.

The electron gun, as best seen in Figs. 1 and 2, includes a cathode 43 having a dished upper surface 44 on which an emissive coating is placed and a heater 45 within the cathode 43. The cathode is supported from the beam forming electrode 47 by a number of fine wires 48, which may be of Nilvar and which provide the required thermal insulation. The cathode 43 and beam forming electrode 47 are carefully checked for concentricity before being placed in position in the groove 41 in the back surface of the cavity block 21 and held in position by having a collar 49 of the beam forming electrode 47 sandwiched between two ceramic insulators 51 and 52. The wires 48 extend through apertures in the collar 49. The ceramic insulators in turn are held in place by means of a spring member 53, which may be of a high temperature spring material such as Inconel-X metal or molybdenum, and a clampring ring 54 secured by screws 55. The upper ceramic 51 determines the spacing between the cathode and the focusing anode 40; the critical requirement on this ceramic spacer is precise parallelism between its top and bottom surfaces, and this may be readily attained. The lower ceramic 52 serves as an insulator only and need not be a precision part. With proper spacing between the cathode and focusing electrode attained, the horizontal position of the cathode beam electrode assembly should be adjusted for accurate alignment of the aperture 28 in the nose or cavity post 27. This may advantageously be attained manually using a toolmaker's microscope to sight through a central cathode hole 56, provided for this purpose, and the nose aperture 28. Concentricities of the order of 0.2 mil are obtained without great difficulty in this manner.

The repeller electrode assembly is mounted by the upper block 22. The repeller electrode 57 has a collar 58 extending between two insulators 59 and 60. The lower insulator 59 rests on the inner base of a cup-shaped housing 61 which has a central aperture 62 therein and a depending integral cylindrical ring 63 encompassing the aperture 62. The repeller electrode 57 extends into the aperture 62 and the depending ring 63 rests on and is brazed to the tuning diaphragm 24 adjacent the choke or shallow recess portion 33 of the cavity block 21 to transmit tuning motion to the diaphragm, as described more fully below.

A spring member 65 bears against the upper ceramic insulator 60 and maintains the repeller electrode in position. The spring 65 is clamped by an upper housing member 66 which is secured to the lower housing 61, as by screws 67. Alignment of the repeller electrode 57 may also be attained by an optical sighting through the hole 55 in the cathode, aperture 28 in the nose 27, and a hole 69 extending through the repeller 57 for this purpose.

The initial gap spacing and thus resonant frequency of the primary cavity 26 is adjusted for cold resonance beyond the upper frequency limit of the expected tuning range of the device by means of a stiff restoring spring 71 which is secured to the upper surface of the upper housing member 66, as by screws 70, and clamped by means of two clamping rings 72 secured, as by screws, not shown, to the upper block 22. The cavity can then be tuned by means of the tuner assembly 11, mounted on one wall of the upper bulb 10, which, through the diaphragm 74, varies the position of a tuning arm 75 extending into the upper bulb portion 10. The actuating elements of the tuner assembly 11 includes the tuning screw 76 and restoring spring 77, and the tuner assembly 11 may be basically similar to that disclosed in W. D. Stratton Patent 2,466,062, April 5, 1949.

In accordance with an aspect of this invention the tuner arm 75 rests on, but is not connected to, a contact pin 79 positoined in a yoke-shaped insulator 80, best seen in Fig. 4. The insulator 80 is held, as by a rod 81 and nuts 85, to an H-shaped linkage member 82, the two legs of which are secured, as by screws not shown, to the spring 71. Tuning is thus attained by varying the angular position of the tuning screw 76 which either depresses the spring 71, transmitting the motion through the housing members 66 and 61, including the ring portion 63, to the tuning diaphragm 24 to reduce the gap spacing or grid separation dimensions of the primary cavity defined by the groove 26 and the diaphragm 24, thereby lowering the frequency of operation, or allows the restoring spring 71 to move upward, thereby, through the mechanical linkage just described, enabling the diaphragm 24 to separate the grids thus increasing the gap spacing and raising the frequency of operation.

In accordance with another aspect of our invention during the processing and fabrication of these devices the position of the diaphragm 24 is initially adjusted, by the spring 71, so that the resonant frequency of the primary cavity is above the desired operating range, as described above, and the tuner arm 75 is positioned removed, as by a few mils, from the contact pin 79. The klystron is then baked out, to degas the internal parts, the envelope is evacuated, and sealed. Following this the tuning assembly 11 is operated so that the tuning arm 75 is just in contact with the contact pin 79. This is recognized, in accordance with an aspect of our invention, by an alarm circuit, as best seen in Fig. 5. The contact pin 79 is connected to one of the leads 15 through the base 13 of the klystron by a flexible lead 88 connected to a wire 89 extending through a hollow insulator 83. The insulator extends through apertures in the upper block 22, diaphragm 24, and cavity block 21. A meter 85, or other indicating or alarm device, and a battery 86 are connected between the particular terminal 16 to which the contact pin 79 is thus electrically connected and the metallic envelope, which is electrically connected to the tuner arm 75. When contact is initially made between the tuner arm 75 and the contact pin 79, this can readily be recognized by the meter 85 or other indicating device employed.

The tuning assembly 11 is then further operated to vary the dimensions of the resonant cavity to bring the frequency of the resonant cavity into the desired operating range of the klystron. The point of initial contact between the tuner arm 75 and the contact pin 79 is a bench mark or starting point for assuring that the klystron is tuned into its desired operating range. It should be pointed out that the first time the klystron is tuned it will not be known how many turns of the tuning screw 76 will be necessary to tune the resonant cavity into the desired operating range. All that is known initially is that this is a starting point well above the desired operating range of frequencies and, undoubtedly, beyond the range of any meters that may be employed to determine the frequency of the output of the klystron. The klystron is then tuned until the upper limit of the frequency range is reached. The number of turns of the tuning screw 76 to attain this condition is then noted and this number of turns is unique for each particular tube. Thereafter, however, in order to assure the tuning of the klystron into the desired operating range, it is only necessary to return to this bench mark, determined when the tuning arm 75 makes initial contact with the contact pin 79, as indicated by the alarm circuit including meter 85, and then further turning the tuning screw 76 the priorly found predetermined distance for that particular klystron.

By maintaining a nominal spacing, as of a few mils, between the tuning arm 75 and the contact pin 79, and thus the mechanical linkage connected to the diaphragm 24, during the bake out of the tube and the other processing steps, the transmission of undesired and uncontrolled motion from the tuning assembly 11 through this mechanical linkage to the diaphragm 24 is avoided. This motion, because of the exceedingly small dimensions involved, might readily result in destruction of either or both grids 30 and 35 and of the diaphragm itself. This motion would be caused by differential thermal expansion of various parts during the processing of the tube.

Further by obtaining a bench mark and once measuring the frequency of the output of the klystron, as described above, it is readily possible to tune the klystron back into its operating range, without employing wave meters which are generally not available at the locations of use of the klystron and without fear or possibility of damaging the diaphragm or grids, if, for any reason, the klystron has been tuned outside of its oscillating range and, so far as the equipment and circuitry associated therewith can tell, has gone dead.

The grids 30 and 35 are advantageously of the type disclosed in R. L. Vance Patent 2,296,885, September 29, 1942, but, because of their minute size, are ad advantageously fabricated by winding superimposed ribbons of tungsten and iron into a tight spiral, securing the ribbons together, punching or grinding first a triangular shaped segment from the spiral and then a disc from this segment, etching the edge of the disc to cause the tungsten laterals to project slightly beyond the iron filler, brazing the disc to a platinum ring, the brazing material flowing along the tungsten laterals at the edges thereof so that the laterals are embedded in the brazing material, and etching out the iron leaving openings between the tungsten laterals and a finished grid. The final etching may be done by an acid etch, but acid etching may damage the rims and give poorly defined laterals including unwanted residuary iron deposits. Advantageously, copper chloride is employed as the etchant. Abrasive particles are added to the etchant and the bath subjected to ultrasonic vibrations from a transducer driven by an ultrasonic wave generator so that the abrasive action of the particles removes free copper deposited on the grid laterals by the etching process as rapidly as it is deposited.

The repeller electrode 57 is advantageously connected electrically to one of the leads 15 through the base 13 by a flexible lead 91 connected to a lead 92 extending through an insulator 93, similar to the priorly described connection from the contact pin 79 to another of the leads 15. Two other of the leads are advantageously connected to the heater element 45, another to the cathode 43, and two others to getters, not shown, as is known in the art.

An appreciation of the size of klystrons in accordance with this invention can be gained from the following dimensions of one specific illustrative embodiment as depicted in Fig. 1. The outer diameter of the primary cavity or groove 26 was 76 mils, the outer diameter of the second groove 32 was 284 mils, the depth of groove 32 was 23 mils, recess 33 was 5.6 mils below the planar surface of block 21, the grid 30 diameter was 19 mils, the grid 35 diameter was 30 mils, the arched tungsten laterals of the grids were ribbons 0.3 mil thick and 3 mils deep, width of the wave guide channel 37 was 148 mils and its depth 74 mils, the transformer step 38 was 60 mils long and 8 mils deep from the planar surface of block 21, the outer diameter of the cavity block 21 was 1⅜ inch. The klystron operates in the 48,000 megacycle to 60,000 megacycle range delivering a maximum of 25 milliwatts of microwave power at a 600 volt beam voltage. Electron beam perveance was $3 \times 10^{-6}$ (amps/volt)$^{3/2}$. The nose or cavity post 28 had a diameter of 30 mils and dissipated about 25 watts. However, due to the one piece construction of the single cavity block 21, this power is readily dissipated to the outside of the tube envelope.

It is to be understood that the above-described arrangements are illustrative of the application of the principles of the invention. Numerous other arrangements may be devised by those skilled in the art without departing from the spirit and scope of the invention.

What is claimed is:

1. In combination, an electron discharge device comprising an envelope, means within said envelope defining a resonant cavity, a tuning diaphragm across said cavity and defining one wall thereof, a tuning assemblage supported by said envelope and having a tuning arm extending into said envelope, a mechanical linkage for transmitting motion from said tuning arm to said diaphragm and comprising a contact insulatingly mounted by said linkage, means for moving said tuning arm into contact with said contact pin, and alarm means for indicating contact between said tuning arm and said contact pin.

2. In the preparation of electron discharge devices tunable by deformation of a diaphragm defining one boundary of a resonant cavity and having a tuning arm, a mechanical linkage for transmitting motion from said tuning arm to said diaphragm and means for moving said tuning arm, the steps of initially adjusting the position of said diaphragm so that the resonant frequency of said cavity is above the desired operating tuning range, positioning said tuning arm removed from said linkage, operating said moving means to bring said tuning arm just into contact with said linkage and then further operating said moving means to vary the dimensions of said cavity an amount to bring the frequency of said resonant cavity into the desired tuning range of said klystron.

3. In the preparation of electron discharge devices tunable by deformation of a diaphragm defining one boundary of a resonant cavity and having a tuning arm, a mechanical linkage for transmitting motion from said tuning arm to said diaphragm and means for moving said tuning arm, the steps of initially adjusting the position of said diaphragm so that the resonant frequency of said cavity is above the desired operating range, positioning said tuning arm removed from said linkage, heating said device to bake out the parts thereof, evacuating said envelope and sealing said envelope, operating said moving means to bring said tuning arm just into contact with said linkage and then further operating said moving means to vary the dimensions of said cavity an amount to bring the frequency of said resonant cavity into the desired operating range of said device whereby thermally induced variations in the position of said tuning arm cannot be transmitted to said diaphragm during the heating, evacuating or sealing of said envelope to damage said diaphragm.

4. A reflex klystron comprising a block of conducting material having a planar top surface, a central aperture, a first annular groove in said planar surface encompassing said aperture and defining the dimensions of the resonant cavity of the klystron, a second annular groove in said planar surface encompassing said first groove, a shallow circular recess in said planar surface between said grooves and communicating therewith, a straight channel in said planar surface extending from said second groove to one edge of said block, said channel defining a wave guide output and having a shallow portion directly adjacent to said second groove defining an impedance transformer between said second groove and the remainder of said channel, and a third annular groove in the back surface of said block opposite said planar surface and encompassing said central aperture, said central aperture being flared to be wider adjacent said back surface than adjacent said planar surface whereby said block between said groove and said central aperture defines a focusing electrode, a grid positioned in said central aperture adjacent said planar surface and located on a peripheral ledge of said block around said central aperture, a diaphragm across said first and second grooves and having an aperture therein aligned with said central aperture, means positioned adjacent said back surface of said block for projecting a stream of electrons through said aligned apertures, a repeller electrode positioned opposite said aligned apertures adjacent said planar surface of said block, and means coupled to said repeller electrode to vary the position of said repeller electrode and said diaphragm to tune said resonant cavity.

5. A reflex klystron in accordance with claim 4 wherein said grid comprises an outer ring and a plurality of ribbons extending across said ring and positioned edgewise to the direction of the electron beam.

6. A reflex klystron in accordance with claim 4 wherein said means for varying the position of said repeller electrode and said diaphragm includes a mechanical tuner assemblage supported by said envelope and including a tuner arm, and a mechanical linkage for transmitting motion from said tuner arm to said diaphragm and including a contact pin insulatingly mounted by said linkage.

7. A reflex klystron in accordance with claim 4 comprising a metallic envelope, said block forming a portion of said envelope.

8. In an electron discharge device, a block of conducting material having a planar surface, an aperture extending through said block, and an annular groove in said surface encompassing said aperture and concentric therewith, said groove defining the dimensions of the resonant cavity of the device and the portion of said surface between said groove and said aperture defining a cavity post, said cavity post having a peripheral ledge in its inner wall adjacent said surface, and a circular grid positioned in said aperture and on said ledge.

9. In an electron discharge device in accordance with claim 8 wherein said grid comprises an outer ring and a plurality of ribbons extend across said ring and positioned perpendicular to the plane of said surface.

10. A reflex klystron comprising an upper metallic bulb portion, a lower metallic bulb portion, and a central metallic portion sealed to said two bulb portions and including a cavity block having a planar top surface, a central aperture, a diaphragm above said surface and a first annular groove in said planar surface encompassing said aperture, a diaphragm above said surface and defining together with said groove the dimensions of the resonant cavity of the klystron, the portion of said surface between said annular groove and said aperture defining a cavity post, electron gun means positioned adjacent the other surface of said block for projecting a stream of electrons through said aperture, and a repeller electrode adjacent said top surface of said block, said cavity block extending integrally to said bulb portions and defining a portion of the envelope of the klystron to dissipate the heat produced by said electron stream on said cavity post.

11. A reflex klystron in accordance with claim 10 wherein said cavity post has a peripheral ledge in its inner wall adjacent said planar surface and a circular grid is positioned in said aperture and on said ledge.

12. A reflex klystron in accordance with claim 10 wherein said planar surface also has a straight channel therein extending to one edge of said block and communicating with said annular groove, said channel defining a wave guide output for transmitting energy from said annular groove.

13. A reflex klystron in accordance with claim 10 wherein said electron gun means and said repeller electrode are both supported by said central metallic portion.

14. An electron discharge device comprising a metallic envelope, a metallic cavity block having a planar top surface, an aperture extending centrally through said block and an annular groove in said surface, a diaphragm across said groove and defining in cooperation with said groove the resonant cavity of the device and means for varying the position of said diaphragm to tune said resonant cavity, said means including a flat metallic spring determining an initial position of said diaphragm, a tuner assembly mounted by said metallic envelope and including a tuner arm extending into said envelope, a contact pin, and means insulatingly connecting said contact pin with said diaphragm for transmission of motion from said pin to said diaphragm, said tuner arm resting on said contact pin whereby operation of said tuner assembly causes said tuner arm to bear against said contact pin and move said diaphragm closer to said annular groove against the resistance of said flat spring.

15. An electron discharge device in accordance with claim 14 further comprising an indicating device, a source of potential, and means connecting said indicating device and said source in series with said tuner arm and said contact pin whereby said device indicates the first contact of said tuner arm and said contact pin.

16. An electron discharge device in accordance with claim 14 wherein said metallic cavity block forms a portion of said metallic envelope.

References Cited in the file of this patent

UNITED STATES PATENTS

| | | |
|---|---|---|
| 1,874,707 | Oswald | Aug. 20, 1932 |
| 2,208,258 | Grobe | July 16, 1940 |
| 2,521,545 | Shepherd | Sept. 5, 1950 |
| 2,571,009 | Brown | Oct. 9, 1951 |